United States Patent [19]
Lang

[11] Patent Number: 6,038,876
[45] Date of Patent: Mar. 21, 2000

[54] MOTOR VEHICLE AIR-CONDITIONING SYSTEM

[75] Inventor: Feng Lang, Nanhai, China

[73] Assignee: Prime Hill Development Limited, Kowloon, The Hong Kong Special Administrative Region of the People's Republic of China

[21] Appl. No.: 09/009,898

[22] Filed: Jan. 21, 1998

[51] Int. Cl.[7] .................................................. F25B 27/02
[52] U.S. Cl. ........................ 62/238.4; 62/323.2; 62/500
[58] Field of Search ................................ 62/238.4, 323.2, 62/500

[56] References Cited

U.S. PATENT DOCUMENTS

| | | | |
|---|---|---|---|
| 4,164,850 | 8/1979 | Lowi, Jr. ................................... | 62/500 |
| 4,301,662 | 11/1981 | Whitnah ................................. | 62/238.4 |
| 4,374,467 | 2/1983 | Briley ..................................... | 62/500 |
| 4,523,437 | 6/1985 | Briley ..................................... | 62/238.4 |
| 5,647,221 | 7/1997 | Garris, Jr. ............................... | 62/500 |

*Primary Examiner*—William E. Tapolcai
*Attorney, Agent, or Firm*—Leydig, Voit & Mayer, Ltd.

[57] ABSTRACT

An air-conditioning system for a motor vehicle having an exhaust pipe for dispensing engine exhaust gas. Includes a container for containing a liquid coolant, a pump for driving the coolant, and a heat exchanger connected to the container and associated with the exhaust pipe to enable the exhaust gas to vaporize the coolant. The system includes a jet device having a side opening and incorporating a nozzle adjacent to the side opening for produce a jet of a first part of the coolant passing through it, thereby creating a negative pressure, due to the venturi effect, at the side opening. An evaporator is provided for the entry of a second part of the coolant, which evaporator is connected to the side opening of the jet device for the application of the negative pressure thereto, thereby causing evaporation of the second part of the coolant entering into the evaporator to produce a cooling effect for cooling the air supplied into a cabin of the vehicle.

18 Claims, 5 Drawing Sheets

MOTOR VEHICLE AIR-CONDITIONING SYSTEM

The present invention relates to an air-conditioning system for use in a motor vehicle, the system being operable by means of exhaust gas of the vehicle.

SUMMARY OF THE INVENTION

According to the invention, there is provided an air-conditioning system for a motor vehicle having an exhaust pipe for dispensing engine exhaust gas, which system comprises a container for containing a liquid coolant, a pump for driving the coolant, a heat exchanger connected to the container and associated with the exhaust pipe to enable the exhaust gas to vaporizes the coolant, a jet device having a side opening and incorporating a nozzle adjacent to the side opening for produce a jet of a first part of the coolant passing through it, thereby creating a negative pressure, due to the venturi effect, at the side opening, and an evaporator arranged for the entry of a second part of the coolant, which evaporator is connected to the side opening of the jet device for the application of the negative pressure thereto, thereby causing evaporation of the second part of the coolant entering into the evaporator to produce a cooling effect for cooling the air supplied into a cabin of the vehicle.

Preferably, the heat exchanger is provided inside the exhaust pipe and forms separate longitudinally extending passages for the exhaust gas and the coolant.

In a preferred embodiment, the heat exchanger comprises a plurality of longitudinally extending hollow cores which define paths for the exhaust gas to pass through and form gaps between adjacent cores for the coolant to pass through.

More preferably, each core has a tubular body which is formed with grooves for increasing its effective surface area and enlarged opposite ends which are hexagonal in shape for close packing and sealing with the respective ends of the adjacent cores to form the gaps.

In another preferred embodiment, the heat exchanger defines a circular arrangement of longitudinally extending outer paths for the coolant to pass through and a central path for the exhaust gas to pass through.

More preferably, the heat exchanger has outer and inner peripheral walls which are inter-connected by a plurality of radial webs to form the respective outer paths, the inner wall being formed with fins extending into the central path.

It is preferred that the exhaust pipe extend through the container and is formed with external fins to act as the heat exchanger.

In a first preferred embodiment, the heat exchanger is arranged to vapourise the first part of the coolant, which is then driven through the jet device for producing the jet and thus creating the negative pressure.

Preferably, the second part of the coolant is driven to enter, via an expansion valve for expansion, into the evaporator for evaporation, and the evaporated coolant is then drawn under the action of the negative pressure, via the jet device, back to the container.

More preferably, the rest of the second part of the coolant cooled by the evaporated coolant inside the evaporator is circulated by a separate pump through a vent for cooling the air supplied into the cabin of the vehicle.

It is preferred that the coolant used be mainly water.

Preferably, the coolant is also used for cooling the engine of the vehicle.

In a second preferred embodiment, the heat exchanger is arranged to heat the coolant and thus vapourise the second part of the coolant, and a vapour/liquid separator is provided to separate the vapourised second part of the coolant from the first part of the coolant, with the first part of the coolant driven through the jet device for producing the jet and thus creating the negative pressure.

Preferably, the vapourised second part of the coolant is driven to enter, via a condenser for condensation and an expansion valve for expansion, into the evaporator for evaporation.

More preferably, the resulting coolant inside the evaporator is circulated through a vent for cooling the air supplied into the cabin of the vehicle and then drawn under the action of the negative pressure, via the jet device, back to the container.

It is preferred that the coolant used is a liquid mixture of a non-volatile oil-based carrier as the first part and a highly volatile cooling medium as the second part.

More preferably, the cooling medium used is at a proportion ranging from 20% to 70% by volume.

In a preferred example, the pump and the jet device are formed in a one-piece construction acting as a compressor.

More preferably, a venturi tube is provided between the nozzle and the pump for stabilising the jet of coolant produced by the nozzle from a high-speed/low-pressure condition into a low-speed/high-pressure condition for driving by the pump.

BRIEF DESCRIPTION OF DRAWINGS

The invention will now be more particularly described, by way of example only, with reference to the accompanying drawings, in which.

DETAILED DESCRIPTION OF PREFERRED EMBODIMENTS

Figure 1:
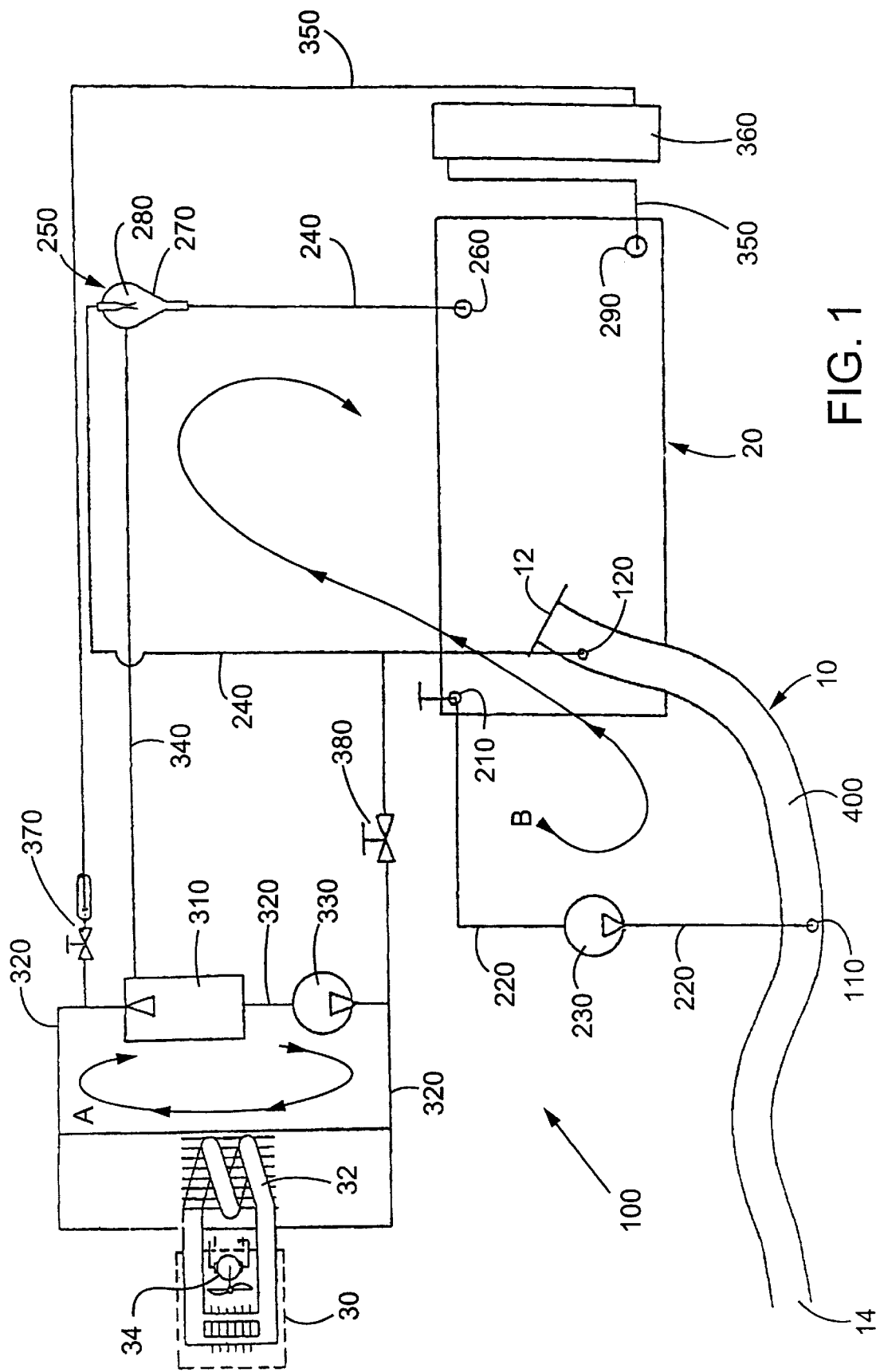
FIG. 1 is a schematic diagram of a first embodiment of an air-conditioning system, for use in a motor vehicle having an exhaust pipe, in accordance with the invention.

Referring firstly to FIG. 1 of the drawings, there is shown a first air-conditioning system 100 embodying the invention for use in a motor vehicle. The vehicle is driven by an internal combustion engine and has an exhaust pipe 10 for dispensing the engine exhaust gas to the atmosphere. The system 100 is to be driven by the exhaust gas being dispensed. The engine is in use maintained at a certain operating temperature by means of a liquid coolant, usually water, contained in a tank 20. Inside the cabin of the vehicle, a vent unit 30 is installed for the supply and/or circulation of air. As generally known in the art, the vent unit 30 incorporates a finned cooling pipe 32 and a motor fan 34.

The air-conditioning system 100 comprises an evaporator 310 which is connected by pipes 320, via a liquid pump 330 at a bottom outlet, to the vent unit 30 to form a closed path A. The tank 20 has a top outlet 210 which is connected by pipes 220, via another liquid pump 230, to a downstream side inlet 110 of the exhaust pipe 10. The exhaust pipe 10 includes an upstream side outlet 120 which is connected by pipes 240, via a jet device 250, to a top inlet 260 of the tank 20. The pump 230 is used to drive the coolant from the tank 20 to travel along a part of the exhaust pipe 10 and then back to the tank 20, following a closed path B. A heat exchanger 400 is provided inside that part of the exhaust pipe 10, which extends from the side inlet 110 to the side outlet 120. The heat exchanger 400 enables the hot exhaust gas dispensed through the exhaust pipe 10 to heat the coolant supplied from the tank 20, and thus vapourise at least a part of it, for passing through the jet device 250 and then back to the tank 20.

The jet device 250 has a casing 270 and an internal co-axial nozzle 280 for producing a high speed jet of the vapourised coolant (a mixture of steam and hot water) passing through it. The resulting jet is intended to create a negative (reduced) pressure, due to the venturi effect, which is then applied to an upper part of the evaporator 310 by means of a pipe 340 branching out from one side of the casing 270 adjacent to the nozzle 280.

The tank 20 has a bottom outlet 290 which is connected by pipes 350, via a cooler 360 and then a pressure-reducing valve 370, to a top inlet of the evaporator 310. The coolant supplied from the outlet 290 is initially cooled down by the cooler 360 and subsequently expanded by the pressure-reducing valve 370 and sprayed from above into the evaporator 310.

Under the action of the negative pressure applied by the jet device 250, the coolant evaporates rapidly inside the evaporator 310, thus dropping sharply in temperature, to provide a cooling effect. Only a small part of the coolant turns into water vapour, which is then drawn away to the jet device 250, travelling along the pipe 340, by reason of the negative pressure. The rest of the coolant, which remains as water but cooled down to almost 0° C., is circulated by the pump 330 through the vent unit 30 for cooling the air supplied into the cabin of the vehicle.

At an equilibrium operating condition, the quantity of coolant leaving the evaporator 310 is equal to the quantity of coolant entering into the evaporator 310.

A control valve 380 is provided between the side outlet 120 of the exhaust pipe 10 and the inlet of the vent unit 30. When this valve 380 is open, the steam generated by the heat exchanger 400 is diverted to pass directly through the vent unit 30 for heating the air supplied into the cabin of the vehicle.

Figure 2:
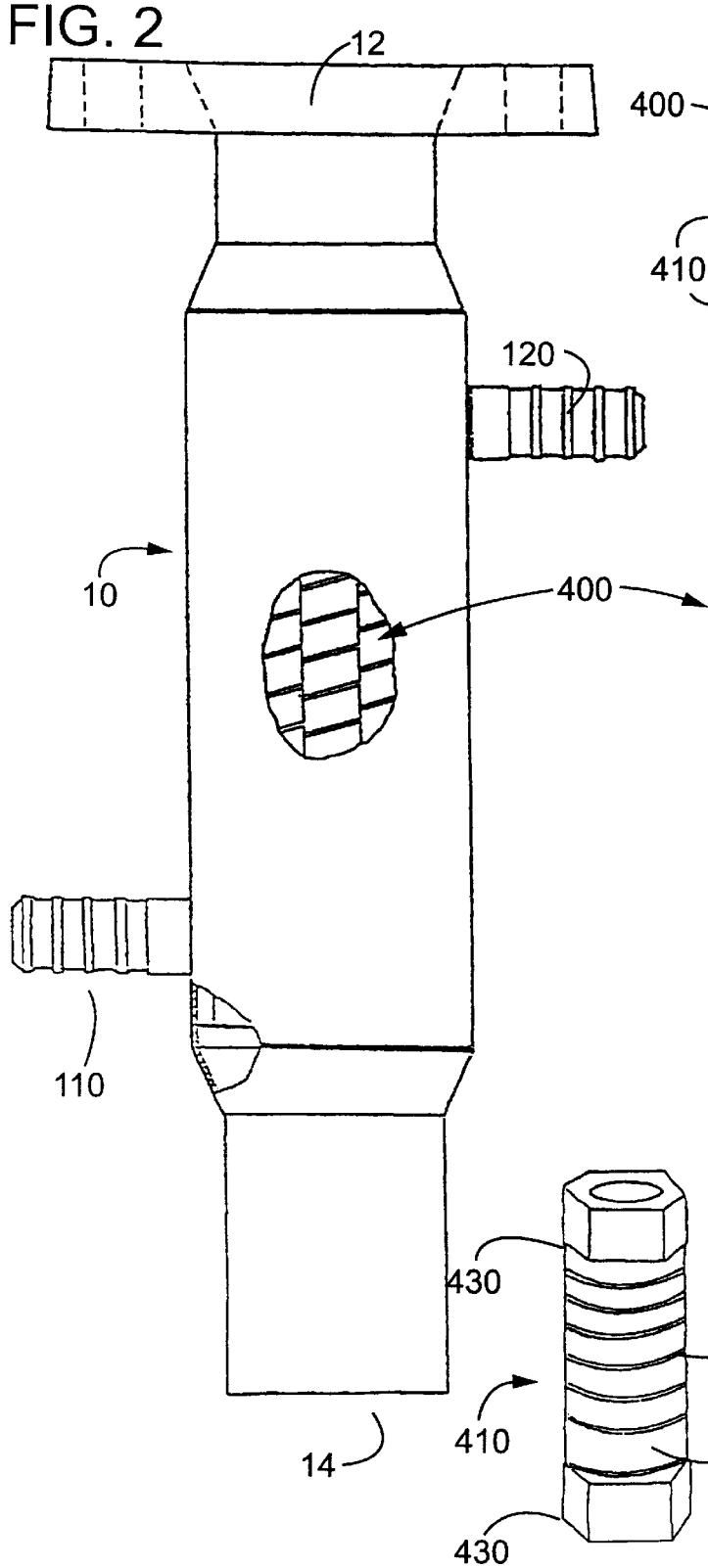
FIG. 2 is a side view of the exhaust pipe of FIG. 1, incorporating a heat exchanger as part of the system.
Figure 3A:
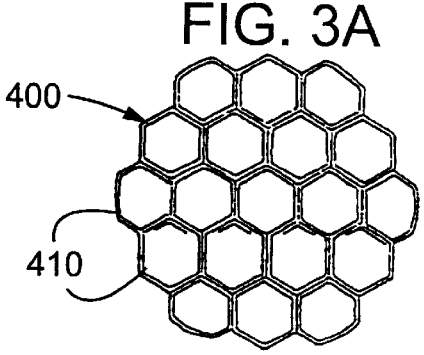
FIGS. 3A and 3B are respectively an end view and a side view and of the heat exchanger of FIG. 2.
Figure 3B:
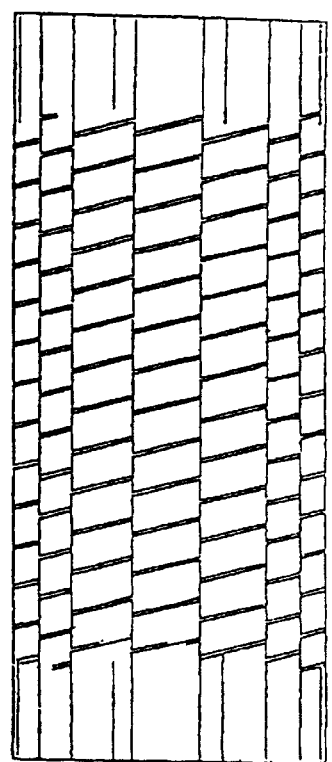
Figure 4:
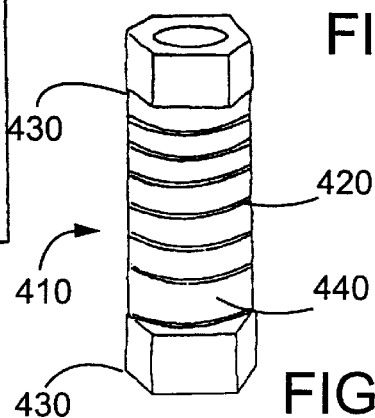
FIG. 4 is a perspective view of one of the cores of the heat exchanger of FIG. 3B.

As shown in FIGS. 2 to 4, the exhaust pipe 10 has inlet and outlet ends 12 and 14 for the exhaust gas. Inside the exhaust pipe 10, the heat exchanger 400 is formed by a bundle of longitudinally extending tubular cores 410. Each core 410 has a cylindrical body 420 and a pair of enlarged opposite ends 430. The ends 430 are hexagonal in shape for close packing and sealing with the respective ends 430 of the adjacent cores 410, thereby leaving gaps around the core bodies 420. Opposite ends of the cores 410 are also sealed with the wall of the exhaust pipe 10 around, such that the exhaust gas is confined to pass through the cores 410 only. The outer surface of each core body 420 is formed with a series of annual grooves or, alternatively, a helical groove 440 for increasing the effective surface area.

In operation, the hot exhaust gas enters into the exhaust pipe 10 at the inlet end 12, then passes through the cores 410 of the heat exchanger 400, and finally leaves at the exhaust pipe outlet end 14. The coolant supplied from the tank 20 enters into the exhaust pipe 10 at the side inlet 110. It then travels through the gaps between the heat exchanger cores 410 and the related grooves 440 for heating and vapourisation by the exhaust gas. The coolant finally leaves at the exhaust pipe side outlet 120.

Figure 5A:
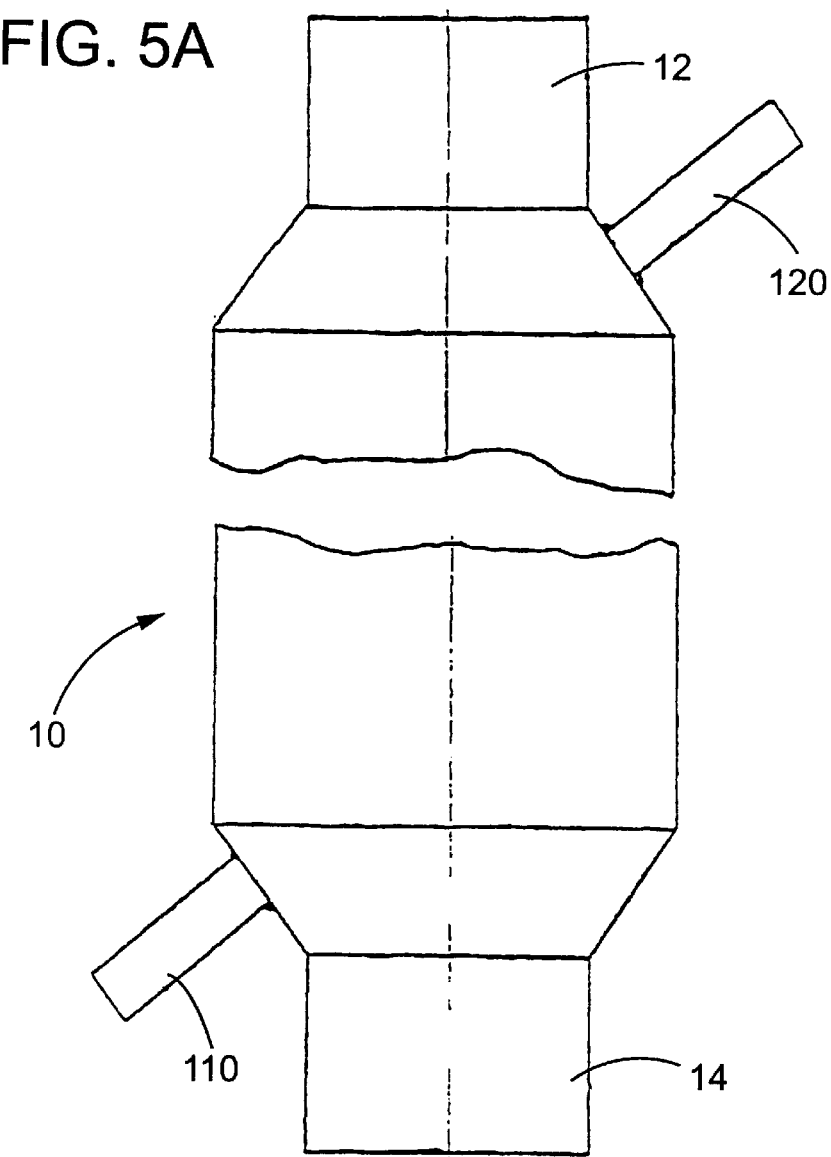
FIG. 5A is a fragmentary side view, showing another construction of the exhaust pipe of FIG. 1, incorporating a different heat exchanger as an alternative part of the system
Figure 5B:
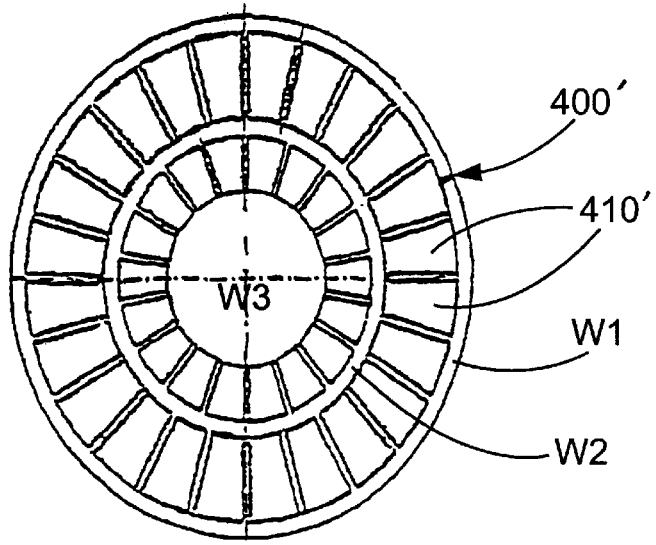
FIG. 5B is a transverse cross-sectional end view of the exhaust pipe of FIG. 5A.

FIGS. 5A and 5B show another construction of the exhaust pipe 10, which incorporates a different internal heat exchanger 400' extending from the side inlet 110 to the side outlet 120. This heat exchanger 400' has outer and inner cylindrical co-axial walls w1 and W2 which are interconnected by a plurality of radial webs to form a circular arrangement of longitudinally extending channels 410'. Opposite ends of the channels 410' are in communication with the respective side inlet 110 and outlet 120, thereby confining the coolant to pass through the channels 410' only. The inner side of the inner wall W2 is formed with radial fins W3 and defines a central passage for the exhaust gas to be dispensed through the exhaust pipe 10, while transferring its heat to the coolant passing through the surrounding channels 410'.

In this air-conditioning system 100, the coolant used is mainly water, to which a suitable anti-freeze, such as alcohol at 20% by volume, is added. Alcohol also has the effect of lowering the boiling point of the water from 100° C. to about 80° C., for promoting evaporation. As an alternative to the use of the normal vehicle water tank 20, a separate container may be used, which thus permits the use of a different coolant for air-conditioning.

Figure 6:
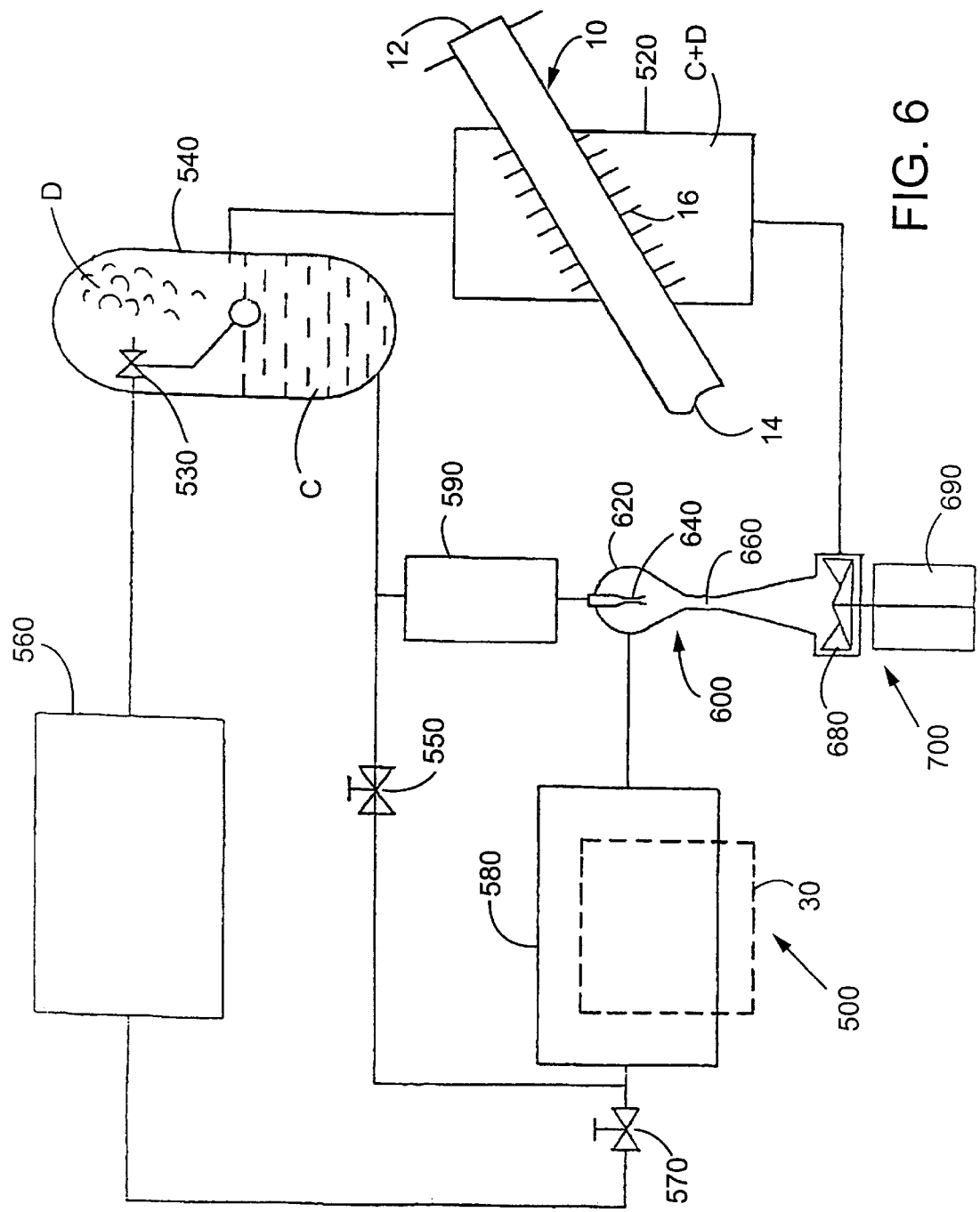
FIG. 6 is a schematic diagram of a second embodiment of an air-conditioning system, for use in a motor vehicle, in accordance with the invention.
Figure 7:
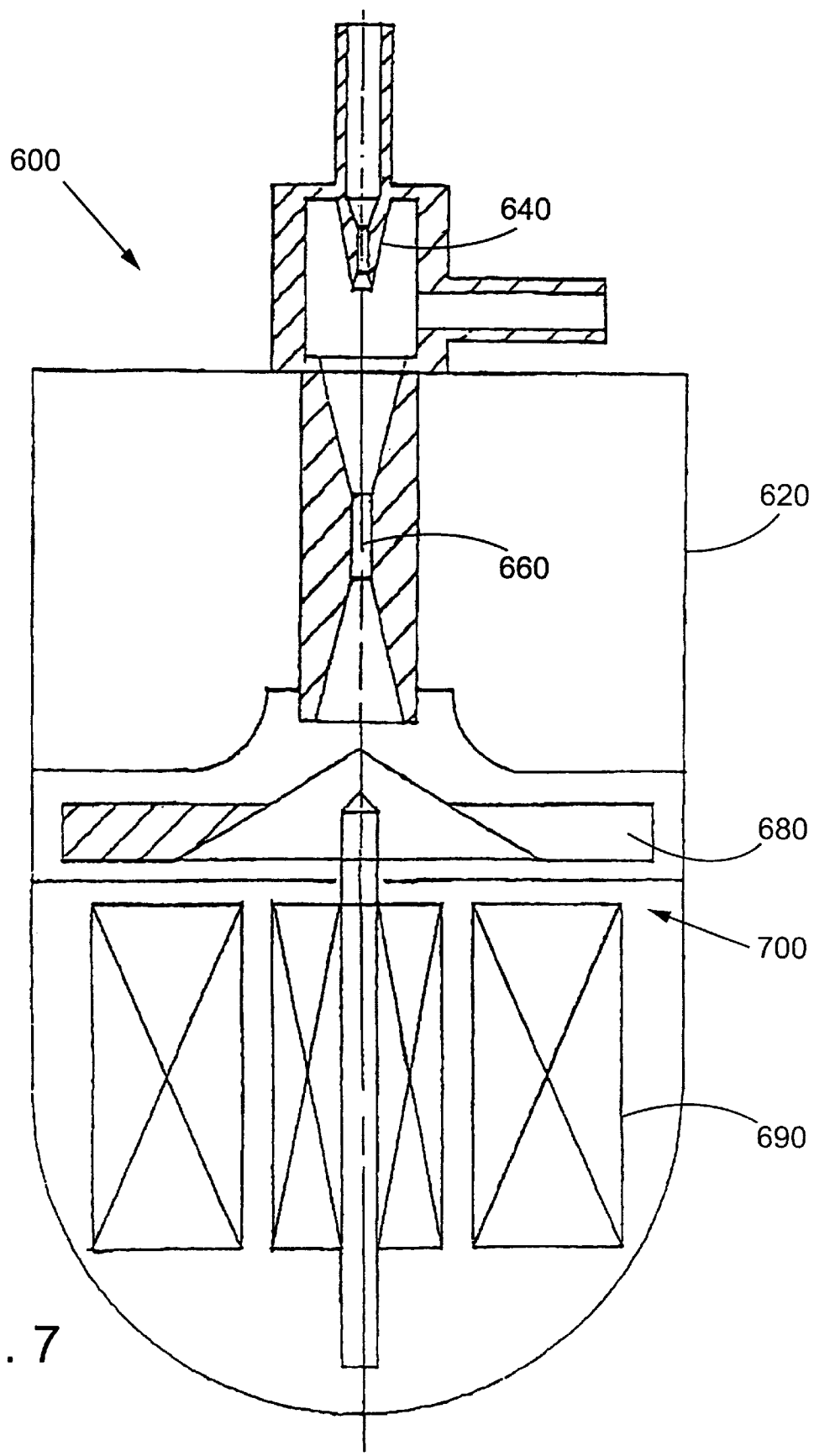
FIG. 7 is a cross-sectional side view of a component of the system of FIG. 6.

Reference is now made to FIGS. 6 and 7 of the drawings, which shows a second air-conditioning system 500 embodying the invention. This system 500 employs a separate container 520 for containing a coolant, which is a liquid mixture of a non-volatile oil-based carrier C and a highly volatile cooling medium D in equal proportion (for example) by volume. The cooling medium D may be a wide variety of conventional coolants, with a preferred coolant being a fluorocarbon coolant such as Freon. ranging from 20% to 70% by volume of the mixture coolant. The exhaust pipe 10 extends directly through the container 520 and is formed with external fins 16 for transferring heat from the exhaust gas to the coolant. The system 500 further includes a vapour/liquid separator 540, a condenser 560, an evaporator 580, a cooler 590 and a jet device 600.

The separator 540 has a middle inlet connected to a top outlet of the container 520, an upper outlet connected to an inlet of the evaporator 580 via the condenser 560 and an expansion valve 570, and a lower outlet connected to the same inlet of the evaporator 580 via a control valve 550 which is normally closed. An internal float valve 530 is used to automatically open and close the upper outlet of the separator 540.

The jet device 600 has a casing 620 having a top inlet, and incorporates a nozzle 640 provided co-axially at the casing top inlet and an internal venturi tube 660 aligned co-axially with the nozzle 640. The bottom outlet of the separator 540, together with that side of the control valve 550, is connected via the cooler 590 to the nozzle 640 of the jet device 600. The casing 620 also has a side inlet which is formed adjacent to one side of the nozzle 640 and connected to an outlet of the evaporator 580. The casing 620 has a bottom half containing co-axially a centrifugal propeller 680 driven by an electric motor 690, which together act as a pump 700. The casing 620 is formed with a side outlet adjacent to one side of the propeller 680, which side outlet is connected to a bottom inlet of the container 520.

In operation, while the pump 700 is turned on, the coolant in the container 520 is heated by the exhaust gas dispensed through the exhaust pipe 10 such that the cooling medium D is vaporised. The vapourised cooling medium D and liquid carrier C then travel upwards into the separator 540. The separator 540 operates to separate the vapourised cooling medium D from the liquid carrier C for exit through the top outlet, with the liquid carrier C leaving through the bottom outlet. The liquid carrier C then travels downwards, via the cooler 590 for cooling, and subsequently enters into the jet device 600 through the nozzle 640. The nozzle 640 produces a high speed jet of the liquid carrier C passing through it, thereby creating a negative pressure, due to the venturi effect. Such a negative pressure is then applied to the evaporator 580 via the side inlet of the jet device 600.

At the same time, the vapourised cooling medium D travels from the separator 540, via the condenser 560 for condensation into a pressurised liquid form, and then enters into the evaporator 580 via the expansion valve 570. Under the action of the negative pressure applied by the jet device 600, the cooling medium D evaporates rapidly inside the evaporator 580 and thus drops sharply in temperature to provide a cooling effect. The then cooled cooling medium D is circulated through the vent unit 30 for cooling the air supplied into the cabin of the vehicle.

Under the action of the negative pressure, the cooling medium D is subsequently drawn from the evaporator 580 to enter into the jet device 600. Inside the jet device 600, the cooling medium D is re-absorbed by the liquid carrier C to form the mixture coolant again. Finally, the coolant is driven by the pump 700 to exit the jet device 600 and re-enter into the container 520, whereby an operating cycle is completed. Throughout the operation, the pump 700 is used alone to drive the coolant, as well as the separated carrier C and cooling medium D, through the system.

The control valve 550 is provided for opening in order to divert the hot liquid carrier C supplied from the separator 540 to the evaporator 580 and hence pass through the vent unit 30 for heating the air supplied into the cabin of the vehicle.

As best shown in FIG. 7, the jet device 600 and the pump 700 are formed in a one-piece construction, which acts as a compressor. More particularly, the liquid carrier C enters via the nozzle 640 as a high-speed/low-pressure jet, which is then stabilised by the venturi tube 660 into a low-speed/high-pressure condition for driving by the propeller 680 of the pump 700.

As possible alternatives, the cooling medium D used may be a solution of any of the following chemical substances: $NH_3$, $CH_3CH_2OH$, $CH=CHCH_2CH_2CH_2$, $(CH_3)_2CHCl$, $(CH_3)_2CHCH_2NH_2$ and $CH_2=CHCH_2OH$. Also, the carrier C may instead be a mineral oil, polyalkyglycol oil or polyester oil.

The invention has been given by way of example only, and various other modifications of and/or alterations to the described embodiments may be made by persons skilled in the art without departing from the scope of the invention as specified in the appended claims.

What is claimed is:

1. An air-conditioning system for a motor vehicle having an exhaust pipe dispensing engine exhaust gas, the air-conditioning system comprising:

a container for containing a liquid coolant, a heat exchanger connected to the container and associated with the exhaust pipe so the exhaust gas vaporizes the coolant, a pump for driving the coolant from the container through the heat exchanger, a jet device having a side opening and incorporating a nozzle adjacent to the side opening of the jet device for producing a jet of a first part of the coolant supplied from the container and passing through the nozzle, thereby creating a negative pressure, due to the venturi effect, at the side opening of the jet device, and an evaporator having an inlet supplied with a second part of the coolant from the container, a side opening connected to the side opening of the jet device for application of the negative pressure to the evaporator, and an outlet, the second part of the coolant evaporating in the evaporator to produce a cooling effect for cooling air supplied into a cabin of the motor vehicle having the exhaust.

2. The air-conditioning system as claimed in claim 1, wherein the heat exchanger is located inside the exhaust pipe and has separate longitudinally extending passages for the exhaust gas and the coolant.

3. The air-conditioning system as claimed in claim 2, wherein the heat exchanger comprises a plurality of longitudinally extending hollow cores defining a path for the exhaust gas and gaps between adjacent cores for the coolant.

4. The air-conditioning system as claimed in claim 3, wherein each core has a tubular body including grooves for increasing effective surface area and enlarged opposite hexagonal ends for close packing and sealing with respective ends of the adjacent cores, thereby forming the gaps.

5. The air-conditioning system as claimed in claim 2, wherein the heat exchanger includes a circular arrangement of longitudinally extending outer paths for the coolant and a central path for the exhaust gas.

6. The air-conditioning system as claimed in claim 5, wherein the heat exchanger has outer and inner peripheral walls inter-connected by a plurality of radial webs forming respective outer paths, said inner walls including fins extending into the central path.

7. The air-conditioning system as claimed in claim 1, wherein the exhaust pipe extends through the container and includes external fins to act as the heat exchanger.

8. The air-conditioning system as claimed in claim 1, wherein the heat exchanger vaporizes the first part of the coolant.

9. The air-conditioning system as claimed in claim 8, including an expansion valve wherein the second part of the coolant enters the inlet of the evaporator through the expansion valve and liquid coolant in the evaporator is drawn, via the jet device, back to the container.

10. The air-conditioning system as claimed in claim 9, including a second pump wherein the part of the second part of the coolant flowing from the outlet of the evaporator is circulated by the second pump through a vent for cooling the air supplied to the cabin of the motor vehicle.

11. The air-conditioning system as claimed in claim 8, wherein the coolant is also used for cooling the engine of the vehicle.

12. The air-conditioning system as claimed in claim 1, including a vapor/liquid separator wherein the heat exchanger heats and vaporizes the second part of the coolant, and the vapor/liquid separator separates the vaporized second part of the coolant from the first part of the coolant.

13. The air-conditioning system as claimed in claim 12, including a condenser and an expansion valve wherein the vaporized second part of the coolant enters the evaporator through the condenser and the expansion valve.

14. The air-conditioning system as claimed in claim 13, wherein the coolant passing through the outlet of the evaporator is circulated through a vent for cooling the air supplied to the cabin of the motor vehicle and drawn by the negative pressure to the container.

15. The air-conditioning system as claimed in claim 1, wherein the pump and the jet device have a unitary construction.

16. The air-conditioning system as claimed in claim 15, wherein a venturi tube is located between the nozzle and the pump for stabilising a jet of coolant produced by the nozzle from a high-speed/low-pressure condition to a low-speed/high-pressure condition for pumping by the pump.

17. An air-conditioning system for a motor vehicle having an exhaust pipe dispensing engine exhaust gas, the air-conditioning system comprising:

a container for containing a liquid coolant;

a heat exchanger connected to the container and located inside the exhaust pipe for vaporizing the coolant and having a plurality of longitudinally extending hollow cores defining separate paths for the exhaust gas and the coolant and gaps between adjacent cores;

a pump for driving the coolant through the heat exchanger;

a jet device having a side opening and incorporating a nozzle adjacent to the side opening for producing a jet of a first part of the coolant supplied from the container and passing through the nozzle, thereby creating a negative pressure at the side opening; and an evaporator having an inlet for entry of a second part of the coolant, distinct from the first part of the coolant, from the container, and a side opening connected to the side opening of the jet device for application of the negative pressure, thereby evaporating the second part of the coolant in the evaporator to produce a cooling effect for cooling air supplied into a cabin of the motor vehicle having the exhaust pipe.

18. The air-conditioning as claimed in claim 17 wherein each core has a tubular body including grooves for increasing effective surface area and enlarged hexagonal opposite ends for close packing and sealing with respect to ends of adjacent cores with the gaps between the adjacent cores.

\* \* \* \* \*